(12) United States Patent
Uth

(10) Patent No.: US 6,494,460 B2
(45) Date of Patent: Dec. 17, 2002

(54) ROTARY BARRIER FACE SEAL

(76) Inventor: Karl E. Uth, 3405 Budleigh Dr., Hacienda Heights, CA (US) 91745

( * ) Notice: Subject to any disclaimer, the term of this patent is extended or adjusted under 35 U.S.C. 154(b) by 0 days.

(21) Appl. No.: 09/750,624

(22) Filed: Dec. 26, 2000

(65) Prior Publication Data
US 2002/0079648 A1 Jun. 27, 2002

(51) Int. Cl.⁷ ................................................ F16J 15/34
(52) U.S. Cl. ........................ 277/399; 277/400; 277/401; 277/431
(58) Field of Search ................................. 277/359, 399, 277/400, 401, 431

(56) References Cited

U.S. PATENT DOCUMENTS 6,109,617 A  *  8/2000  Laney ......................... 277/369
6,135,458 A  * 10/2000  Fuse ........................... 277/382
6,155,572 A  * 12/2000  Wu et al. .................... 277/304
6,196,790 B1 *  3/2001  Sheridan et al. ............ 415/111
6,325,378 B1 * 12/2001  Okumachi et al. .......... 277/348

* cited by examiner

Primary Examiner—Anthony Knight
Assistant Examiner—E Peavey
(74) Attorney, Agent, or Firm—Marvin E. Jacobs

(57) ABSTRACT

Rotary barrier face seal of the non-contact type seal with helical grooves for a housing and a shaft, comprising means for introduction of an external barrier fluid towards the sealing interface. Said barrier fluid prevents sealed process fluid from entering past the sealing interface, thus providing sealing means for hazardous or repugnant fluids.

5 Claims, 3 Drawing Sheets

ROTARY BARRIER FACE SEAL

TECHNICAL FIELD

The invention relates to sealing devices for rotatable shafts, where either sealed or barrier fluid is employed to generate hydrostatic and hydrodynamic forces or aerostatic and aerodynamic forces between stationary and rotary seal faces to establish separation for their non-contact operation.

BACKGROUND OF THE INVENTION

Rotary fluid film face seals, also known as non-contact seals are applied to high speed and high pressure rotary shaft sealing operations, where otherwise face contact would cause excessive heat generation resulting in wear and tear of the seal faces. In a non-contact seal face operation, seal faces will separate when rotational velocity reaches lift-off speed and thus undesirable face contact is avoided.

A most successful method of generating non-contact separation between two sealing faces is by applying a shallow helical groove pattern on either one of the surfaces of the sealing faces, while the opposite sealing face remains flat and smooth. The area where the two sealing faces define a sealing clearance is labeled the sealing interface. The referred helical groove pattern applied to one of the sealing faces extends inward from the higher pressure circumference of the outer diameter to the inner end of the helical groove specified as the groove diameter.

The helical groove pattern forces fluid during shaft rotation from the higher pressure end of the sealing interface toward said groove diameter and thus drives the sealed fluid into remaining non-grooved portion of the sealing interface, thus keeping the sealing faces separated. While a certain amount of fluid will pass through the sealing interface from the side of higher pressure to the side of lower pressure, such fluid amount is considered the seal leakage, an undesirable result of the need to maintain seal face separation. The cooperation between the helical grooved area and the non-grooved area on one of the sealing faces is a most effective approach to maintain a stable gap designated the sealing clearance.

The helical groove pumping action is an effective mechanism to move fluids in between the sealing interface, regardless of whether there are pressure differences or even against pressure differentials. Moreover, even in reversed pressure differential situations, the helical groove seal still operates with adequate separation between the sealing faces, but invariably accompanied by a certain amount of leakage. Such seals are frequently used to divide two different fluids near atmospheric pressure from each other or in contingencies where intermixing of fluids must be prevented if one of them is flammable and the other one is air.

STATEMENT OF THE PRIOR ART

With the presence of elevated rotational velocities and pressures it becomes increasingly difficult to establish a true barrier to prevent intermixing of fluids in non-contact operation. Prior art solutions include the introduction of a third, less chemically active fluid defined as an inert fluid using Nitrogen, Carbon Dioxide or Helium to establish a barrier in a process called buffering. Said buffering can take two forms, either outside or within the sealing interface. Buffering outside the sealing interface requires incomparably larger amounts of costly inert gas due to large radial clearances requiring high flow rats of fresh, uncontaminated buffer fluid, whereas buffering inside the sealing interface, where both sealing clearances and fluid volume subjected to intermixing require much smaller amounts of buffer fluid. U.S. Pat. No. 4,523,764 provides for such purpose a buffer flow inlet as well as buffer flow outlet towards and away from the sealing interface, which as opposed to the present invention requires at least two fluid flow connections to the sealing face to establish a sealing clearance, then to recover part of the buffer fluid and more to provide for a true barrier function.

U.S. Pat. Nos. 4,212,475, 3,704,019 and 3,499,653 on the other hand, employ spiral grooves to establish a stable sealing clearance, but does not provide a solution to sealing applications, where true fluid separation or barrier is mandated.

STATEMENT OF THE INVENTION

According to the invention, buffer fluid is injected directly into and adjacent the upstream end of the sealing interface, with buffer fluid pressure slightly above that coming from the process end of the barrier unit, whereby some amount of buffer fluid is leaking towards the direction of the process, such being diametrical to that of normal interface flow and therefore terminating process fluid flow towards the sealing interface. Said amount of leakage is notably modest since it occurs through an extremely small sealing clearance of less than about 35 microns, preferably less than about 12 microns as compared to 120 microns, when buffering takes place outside the sealing interface. Resulting buffer fluid intermixing, consumption and cost being orders of magnitude smaller, when buffered inside the sealing interface, where above extremely small sealing clearances are a true result of optimum utilization of partial helical groove pattern.

Said minimal buffer fluid consumption makes it possible to minimize flow passages, which in turn facilitates the provision of more interface area for partial helical grooves, thus enhances a narrower and more stable clearance. Minimal buffer fluid consumption also makes it possible to avoid having to recover buffer fluid and having to provide flow passages for it which would once further reduce the sealing interface area needed for the advantageous benefits of the partial helical grooves.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
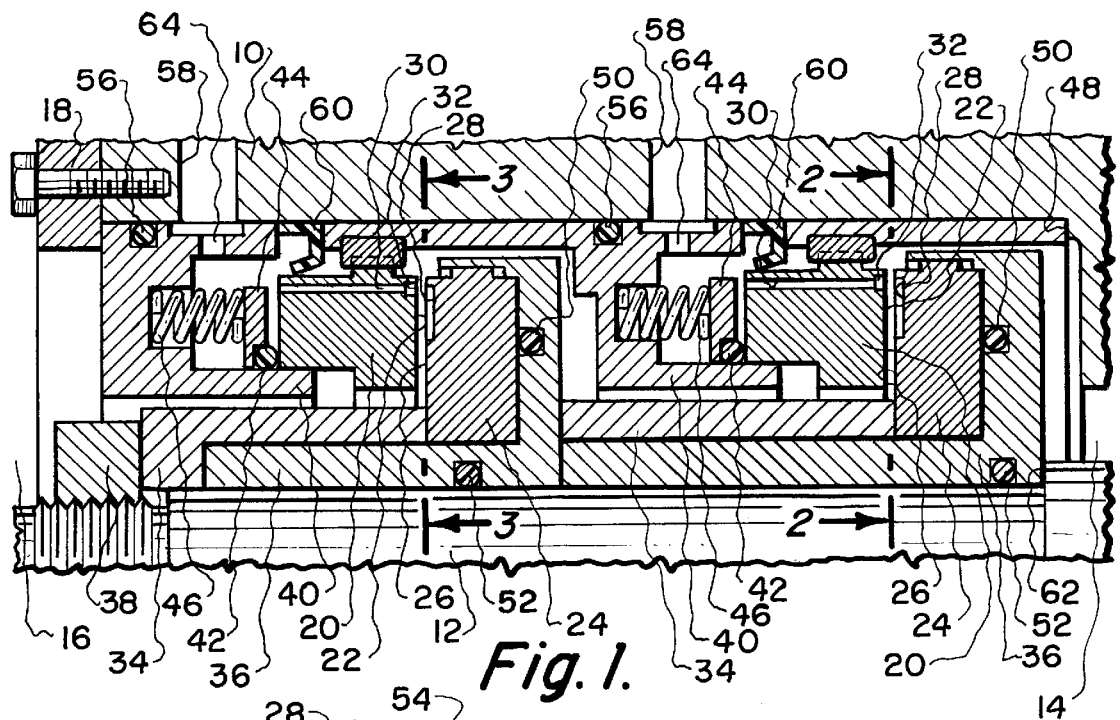
FIG. 1 is an axial quarter sectional view, showing an identical tandem arrangement of a Rotary Barrier Face Seal.

FIG. 1 displays the preferred embodiment of the invention and its environment. This environment comprises a housing 10 and a rotatable shaft 12, extending through said housing. The invention is applied to seal and separate fluid within the annular space 14 from the fluid environment at 16.

Basic components of the rotary barrier seal face of the invention comprise an annular stationary ring 20, having a radial extending face 22 in sealing relation with a radial extending face 26 of an annular rotary ring 24. The stationary ring 20 is held in place by an annular retainer 40, and its outer diameter engages a lip of the low friction static seal 60. Cover 18 locks the retainer 40 and the static seal 60 against the shoulder 48 of the housing 10 to prevent axial movement.

An O-ring seal 56 extends around the outer circumference of the retainer 40 to preclude leakage of buffer fluid at ports 58 and 64 into fluid environment 16 between retainer 40 and housing 10. Amid retainer 40 and stationary ring 20 is a plurality of springs 46, spaced equidistantly around the circumference of retainer 40. Springs 46 act against an annular disc 44, urging the stationary ring 20 into engagement with the rotary ring 24. An O-ring 42 seals the space between the stationary ring 20 and retainer 40. The rotary ring 24 is retained in the axial position by the drive sleeve 36 and the clamp sleeve 34. Drive sleeve 36 and clamp sleeve 34 are concentric with the shaft 12 and both are locked on to the shaft 12 between shaft shoulder 62 and locknut 38 threaded onto shaft 12. The O-ring seals 50 and 52 preclude leakage between the rotary ring 24, the drive sleeve 36 and the shaft 12.

In operation, radial extending face 22 of the stationary ring 20 and radial extending face 26 of rotary ring 24 are in sealing relationship, maintaining a very narrow sealing clearance, generated by a helical groove pattern 28 on the sealing face 26 of the rotary ring 24. Opposite arrangements with said helical groove pattern on the sealing face 22 of the stationary ring 20 are also effective and will be shown below.

Said narrow clearance prevents generation of friction heat and wear, yet limiting consumption and outflow of the buffer fluid supplied through opening 30 into crescent-shaped pockets 32 which have a pressure-equalizing function, whereas the same function can also be achieved by means of an annular recess, which will be shown below.

Figure 2:
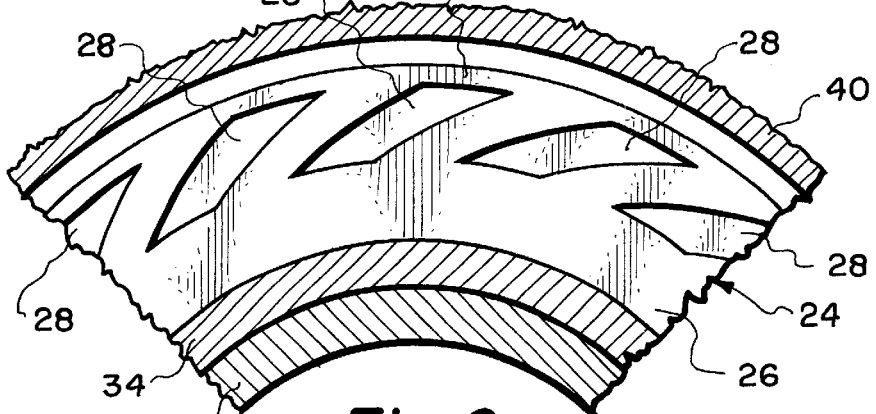
FIG. 2 is a view in elevation, partially in section of the sealing face taken along line 2—2 of FIG. 1.

FIG. 2 shows a view in elevation of the sealing face 26 of the rotary ring 24 with a pattern of helical grooves 28 according to FIG. 1, taken along line 2—2. Shown helical grooves 28 are directed counter-clockwise and inward for a particular direction of shaft rotation and will be directed clockwise and inward for the opposite direction of shaft rotation. Non-grooved area 54 at the outside diameter of the sealing face 26 fosters restriction of outflow of buffer gas into process fluid at annular space 14 of FIG. 1 as will be shown below.

Figure 3:
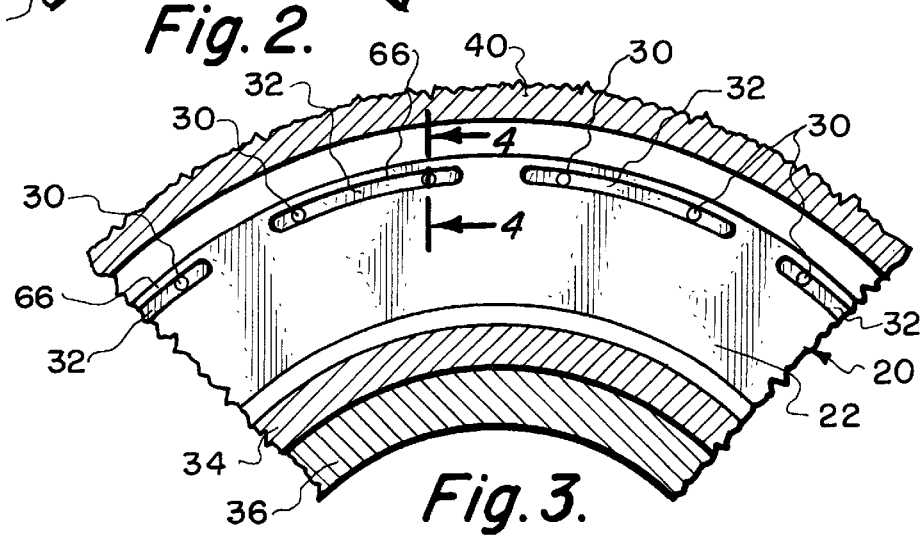
FIG. 3 is a view in elevation, partially in section of the sealing face taken along line 3—3 of FIG. 1.

FIG. 3 is a view in elevation of the seal face 22 of the stationary ring 20 according to FIG. 1 taken along line 3—3. Exposed are openings 30 for the supply of the buffer fluid. Pressure of said buffer fluid is circumferential equalized by concentric crescent-shaped pockets 32, whilst outward outflow of said buffer fluid is restricted between narrow dam 66 and the non-grooved area 54 of the sealing face 26 as shown in FIG. 2. Although FIG. 3 shows said crescent-shaped pockets within stationary ring 20, the same pressure equalizing arrangements will also be effective with said pockets within said rotary ring.

Figure 4:
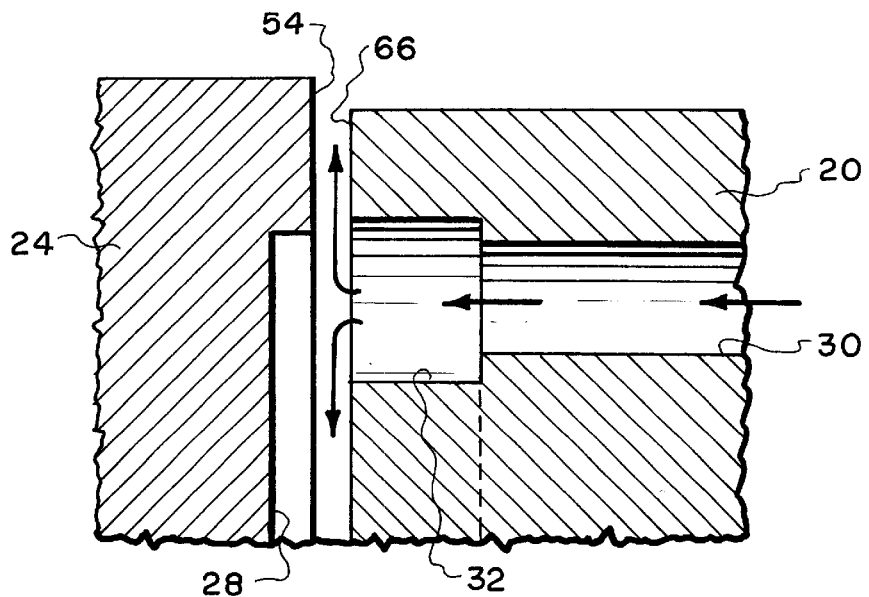
FIG. 4 is an enlarged sectional view taken along line 4—4 of FIG. 3.

FIG. 4 shows an enlarged view in section taken along line 4—4 of FIG. 3, through both stationary ring 20 and rotary ring 24. Arrows within clearance between rotary ring 24 and stationary ring 20 show the direction of buffer fluid outflow from pockets 32 and opening 30, exposing the key mechanism for maintaining separation of process fluids between space 14 and at environment 16 according to FIG. 1 and according to FIG. 5 shown below.

Figure 5:
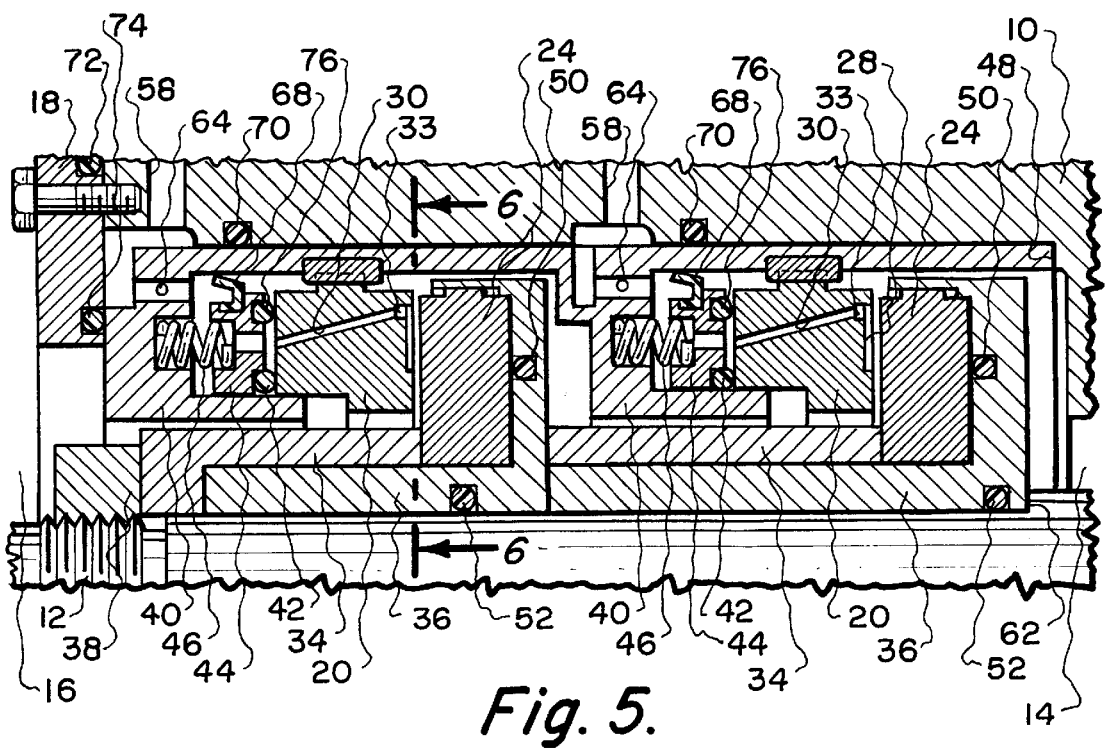
FIG. 5 is an axial quarter sectional view of an alternate embodiment of the Rotary Barrier Face Seal.

FIG. 5 shows another embodiment of the invention, where low friction static seal 68 engages with the bore of the retainer 40 and rests within disc 44. An additional O-ring 76 between disc 44 and stationary ring 20 prevents intermixing of buffer fluid and process fluid at space 14. Static O-ring seals 70 and 72 as well as 74 help channel said buffer fluid via ports 58 and 64 toward openings 30 and a circumferential groove 33.

Figure 6:
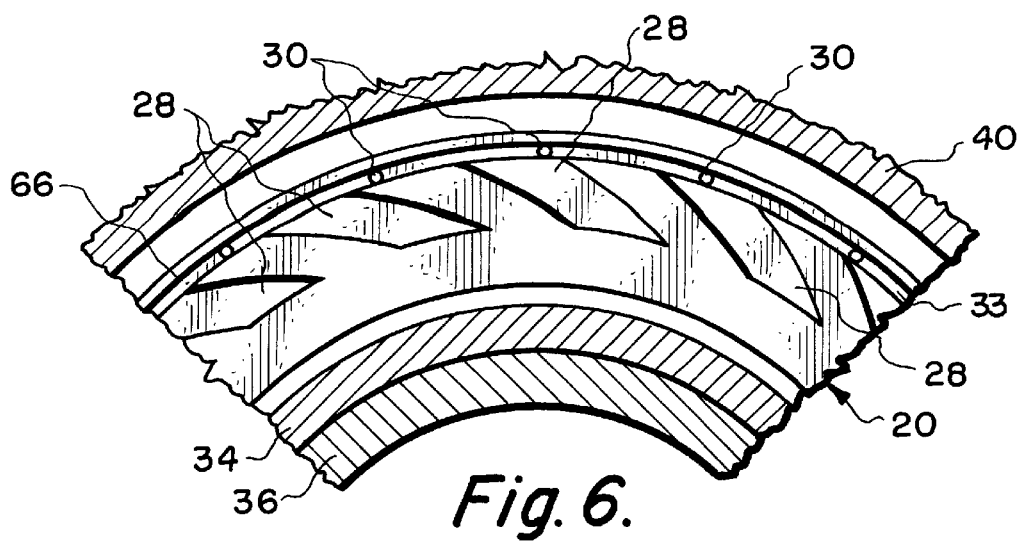
FIG. 6 is a view in elevation, partially in section of the sealing face taken along line 6—6 of FIG. 5.

FIG. 6 shows a view in elevation of the sealing face according to FIG. 5 taken along line 6—6, where the partial helical groove pattern is formed in the sealing face 22 of the stationary ring 20. Circumferential groove 33 is located near the stationary ring 20 outer diameter, from which it is separated by a narrow dam 66. Said circumferential groove 33 serves to equalize buffer fluid pressure circumferentially, while it can be formed in either one of the two sealing faces to obtain the above purpose. Inner circumference of the groove 33 defines outer extent of the pattern of helical grooves 28.

Figure 7:
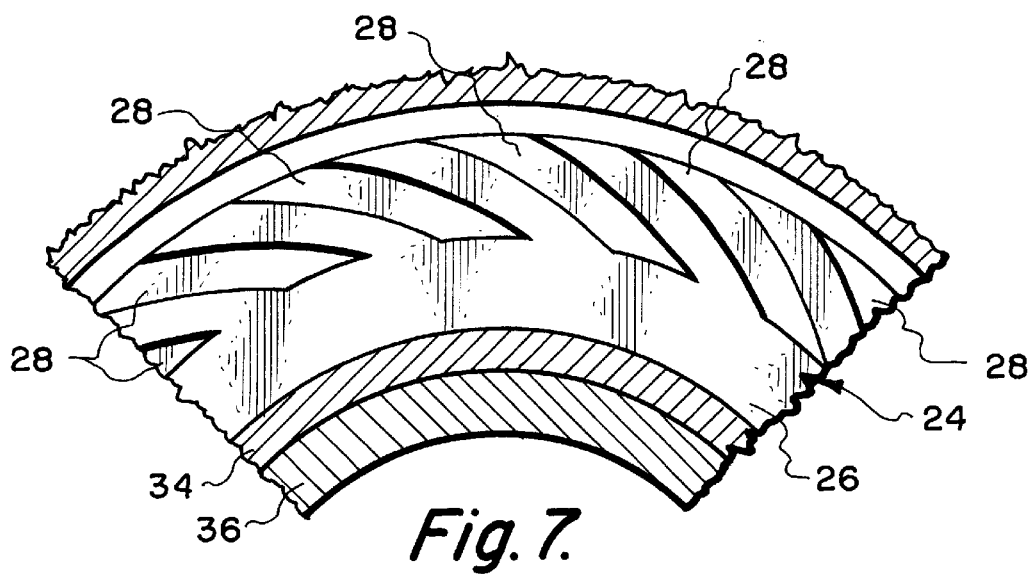
FIG. 7 is a view in elevation, partially in section of an alternate embodiment of the sealing face.

FIG. 7 shows another embodiment of the elevation view of the rotary ring 24 according to FIG. 1 taken along line 2—2. This arrangement does not embrace a non-grooved dam area at the outer diameter of the face 26 and my be applied in situations where helical groove pattern is exceedingly shallow.

Figure 8:
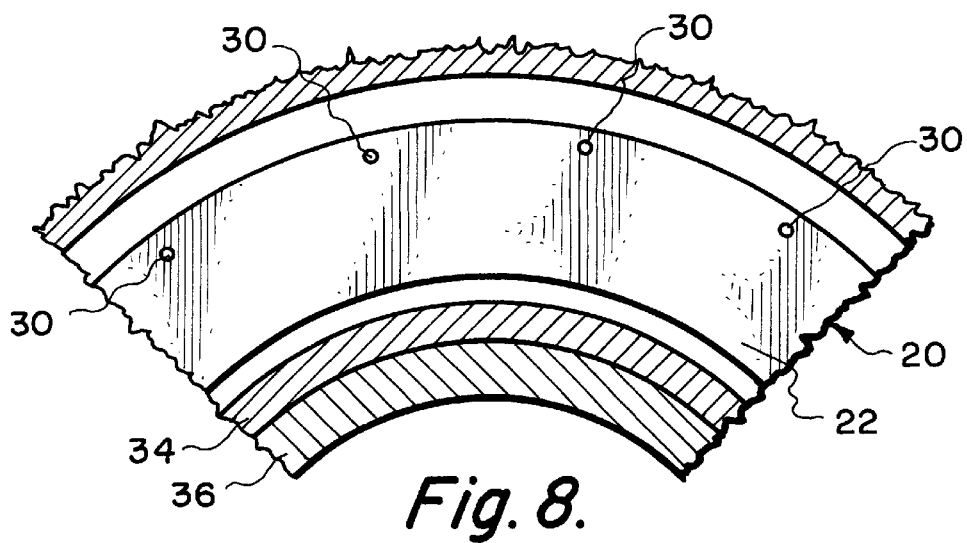
FIG. 8 is a view in elevation, partially in section of a further embodiment of the sealing face.

FIG. 8 shows another embodiment of the elevation view of the stationary ring 20 according to FIG. 1 taken along line 3—3. A plurality of openings 30 supply buffer fluid into the sealing face 22 of said stationary ring 20.

It is to be realized that only preferred embodiments of the invention have been described and that numerous substitutions, modifications and alterations are permissible without departing from the spirit and scope of the invention as defined in the following claims.

What is claimed is:

1. A rotary barrier face seal for sealing a toxic process fluid at a space between a housing and a rotatable shaft, comprising:

a stationary ring unit coaxially surrounding said rotatable shaft within said housing and arranged for movement axially of said rotatable shaft under a resilient pressure;

a rotary ring unit coaxially surrounding said rotatable shaft within said housing and prevented from axial movement relative to said rotatable shaft when in operation position;

each of said ring units having an end face for mutual engagement under said resilient pressure to form a sealing interface;

one of said ring units being mounted for rotation with said rotatable shaft;

one of said end faces comprising a plurality of helical grooves, said plurality of helical grooves extending inward, the innermost extent of said plurality of helical grooves defining an inner groove diameter, said inner groove diameter being larger then the diameter of the innermost extent of either of said end faces;

one of said end faces comprises a plurality of crescent-shaped pockets each containing a buffer gas supply opening adjacent each terminus of each pocket and each said opening being positioned at a fluid supply diameter concentric with said rotatable shaft and communicating with said sealing interface each supply opening being positioned above a buffer gas supply bore, the diameter of the supply opening being larger than the diameter of the supply bore; and buffer fluid supply means communicating with said at least one supply bore to supply a buffer fluid to the sealing interface.

2. A rotary barrier face seal according to claim 1 wherein the outermost extent of said plurality of helical grooves coincides with the outermost extent of that said end face which includes said plurality of helical grooves.

3. A rotary barrier face seal according to claim 2 wherein one of said end faces comprises at least one crescent-shaped pocket communication with said at least one supply bore.

4. A rotary barrier face seal according to claim 1 wherein the outermost extent of said plurality of helical grooves defines an outer groove diameter, said outer groove diameter being smaller than the diameter of the outermost extent of either of said end faces.

5. A rotary barrier face seal according to claim 1 in which said crescent-shaped pockets extend around the end face along said fluid diameter.

* * * * *